US005603490A

United States Patent [19]
Folsom

[11] Patent Number: 5,603,490
[45] Date of Patent: *Feb. 18, 1997

[54] FIBER-REINFORCED PLASTIC SPRINGS WITH HELICAL FIBER WIND

[76] Inventor: Mark F. Folsom, 25747 Carmel Knolls Dr., Carmel, Calif. 93923

[*] Notice: The term of this patent shall not extend beyond the expiration date of Pat. No. 5,549,370.

[21] Appl. No.: 485,969

[22] Filed: Jun. 7, 1995

Related U.S. Application Data

[63] Continuation-in-part of Ser. No. 335,060, Nov. 7, 1994, Pat. No. 5,549,370.
[51] Int. Cl.$^6$ .................................................. F16F 1/02
[52] U.S. Cl. ................................. 267/149; 267/282
[58] Field of Search ........................... 267/148, 149, 267/154, 281, 282, 283, 285

[56] References Cited

U.S. PATENT DOCUMENTS 3,869,113  3/1975  Dudek ........................... 267/282
4,473,217  9/1984  Hashimoto .................... 267/149

FOREIGN PATENT DOCUMENTS 144837  8/1984  Japan ............................ 267/149

*Primary Examiner*—Matthew C. Graham
*Attorney, Agent, or Firm*—LaRiviere, Grubman & Payne

[57] ABSTRACT

Fiber-reinforced composite springs having a unidirectional fiber wind. The present invention is a cylindrical torsion bar, or a helical tension or compression spring having a core that is either unreinforced, axial-fiber reinforced, or twisted fiber-reinforced, and a continuous-fiber-reinforced composite cladding having most or all of its fibers helically arrayed around the core. The core may be solid or hollow. The sense of the helical winding is that which places the fibers in tension when the spring is used as intended. A cladding fiber winding helix angle of approximately 55° is used with a weak and unreinforced core, while larger or smaller helix angles are used only with a cores having sufficient stiffness to resist axial-normal stress. By carefully selecting the materials for the core and cladding, as well as utilizing a core twist and a fiber winding helix angle appropriate to the application, significant advantages over prior art springs are realized in energy per-unit-volume, energy per-unit-weight, and spring velocity.

12 Claims, 3 Drawing Sheets

FIBER-REINFORCED PLASTIC SPRINGS WITH HELICAL FIBER WIND

This application is a continuation-in-part of application Ser. No. 08/335,060, filed Nov. 7, 1994, now U.S. Pat. No. 5,549,370.

TECHNICAL FIELD

The present invention relates to composite springs formed of reinforcing fibers embedded in a plastic resin matrix. More particularly, the present invention relates to unidirectionally-wound composite torsion bars and helical compression and tension springs. The composite springs of the present invention are formed by winding, at specified wind angles, matrix-bonded reinforcing fibers around a core material. The core material may or may not be reinforced. Springs according to the present invention are further formed of carefully selected materials to maximize the energy per unit volume and energy per unit weight for a given spring application.

BACKGROUND ART

Springs and spring-like objects have been made from fiber-reinforced composites by workers in several fields of endeavor. Such composites typically include reinforcing fibers in a thermosetting resin matrix. One well-known such family of composite materials is Owens-Corning™ Fiberglass®. Flat springs such as fiberglass fishing rods and hunting bows have long been in use, and at least one American automobile has been produced with a glass-reinforced transverse leaf spring for some time. U.S. Pat. Nos. 4,468,014 to Strong and 4,718,693 to Booher teach variations of such glass-reinforced composite leaf springs. Torsional springs made of reinforced composites have also been the subject of efforts by others. U.S. Pat. No. 2,812,936 to Setz, hereinafter '936, details one such effort using alternating, or cross-woven helical windings.

Composite helical springs have also been patented. U.S. Pat. Nos. 4,260,143 and 4,380,483 to Kliger, hereinafter '143 and '483, teach composite helical springs made with fibers braided so that they lie roughly 45° from the axis of the main helix, with successive layers alternating their direction of twist. Other composite helical springs have been made with the reinforcing fibers parallel (or nearly so) to the main helix of the spring. One such spring, taught by U.S. Pat. No. 4,473,217 to Hashimoto, features a bundle of fibers which is twisted into a rod-shaped bundle, saturated with a thermosetting resin, and the resultant bundle formed into a helical spring. Each of these designs provide superior function and light weight over prior art metallic springs and spring-like objects, but fails to optimize the performance of such composite springs by failing to recognize some of the forces inherent in spring design, and optimizing the orientation of the reinforcing fibers.

Hashimoto, in stating that ". . . the elastic characteristics of the rod-shaped fiber bundle have varied due to the amount of twisting, it is necessary to determine the amount of twisting the rod-shaped fiber bundle according to the desired elastic characteristic of the fiber bundle. (sic)" teaches modification of core twist to change the elastic characteristics of the core, and thus presumably the resultant spring. This teaching fails to appreciate several important points: first, the core of the spring has significantly less effect on the elastic characteristics of the resultant spring than do the reinforcing fibers on the periphery of the cross section, hereafter referred to as the cladding. Next, with respect to the core, an even more important factor for determining the degree and direction of core twist is the minimization of shear stresses on the reinforcing fibers thereof. The core of a spring wound as tightly, for instance, as illustrated in FIGS. 2 and 3 of the Hashimoto reference will impose significant shear stresses on the core reinforcing fibers, resulting in increased internal friction and decreased service life. Further, these shear stresses are amplified when the cladding is wound with the opposite sense of the core twist. Finally, excessive core twist increases the difficulty, and hence cost, of manufacturing such a spring.

The prior art composite torsion and helical designs present several areas for improvement. First, the braided or cross-woven designs require that the reinforcing fibers (hereinafter "fibers") be wound in both directions around the helical bundle. This means that, in a given application, many of the fibers, particularly those in compression, will not carry load well. Secondly, pertaining to braided designs, the fibers cannot be aligned with the forces acting on them, as being braided, those fibers are woven about one another and are hence always crooked. This makes the fibers loaded in compression tend to instability and buckling. Finally, the angle at which the reinforcing fibers is wound in the spring has significant impact on the properties of that spring. The prior art does not teach a methodology to optimize this wind angle.

An analysis of the forces generally operating on springs will help to provide a solution to the previously discussed disadvantages with prior art composite torsion and helical spring designs, as well as realizing further benefits accruing from an optimally designed composite spring.

Compression, tension and torsion-bar springs are typically cylindrical in section. Compression and tension springs are generally helical in form. Torsion bars are generally straight. The cross-section of each of these types of spring is stressed mostly in shear by torsion loading, with generally much smaller stresses caused by bulk shear and tension or compression. It follows then that the greatest shear strain, and thus stress, occurs at the outermost portion of the section, and that the inner portions are little stressed and contribute little to the spring's ability to store energy.

From the preceding, we can deduce that most of the energy stored in a composite torsional or helical spring is stored in the outermost fiber layers, and that fibers closest to the center of the cross-section store little, if any useful energy. These fibers, in prior art composite springs, serve primarily to maintain the form of the spring and do little actual work, or store little actual energy.

The helical springs which use fibers roughly parallel to the main helix, such as taught by '217, are useful as helical torsion springs, where the spring section is actually loaded in bending. However, they are not optimally effective as tension or compression springs, since the torsion on these spring sections cannot be reacted by the fibers, which would be perpendicular to the applied stress.

Springs are often loaded either wholly or predominantly in one direction: tension, compression, or unidirectional torsion. This fact provides an insight into spring design apparently overlooked by the prior art: namely, that in many applications it is not necessary that the spring be capable of both tension and compression loading. By optimizing the orientation of the reinforcing fibers, it will be shown that such springs possess advantages over prior art metallic and composite springs. These advantages include improvements in physical size, density and reduction of shock transmitted through the spring as a wave force, elastic potential energy (both on a per-unit-volume and on a per-unit-weight basis), surge frequency, and maximum axial velocity.

The abstract purpose of a spring is to store energy, imparted to the spring in the form of work, as elastic potential that can be used to restore the spring, and the using function, to its original state. In cases where it is desirable to minimize the size, weight or dynamic-surge-loading of a spring, the material properties that are most important are working strength, elastic modulus and mass density. The energy per unit volume in any spring is proportional to the working strength squared divided by the elastic modulus, or $$\frac{U}{V} \propto \frac{S^2}{E}$$

where

U=maximum elastic potential energy

V=active spring volume

S=working strength of the spring material and

E=spring material elastic modulus.

The energy per unit weight in a spring is the energy per unit volume, above, divided by the density of the spring, or $$\frac{U}{W} \propto \frac{S^2}{\rho E}$$

where

W=spring weight and

ρ=spring material density.

On both energy per-unit volume and per-unit-weight bases, it becomes apparent that the maximum elastic potential energy of a given spring increases with a decrease in the elastic modulus of the material forming the spring. Further gains are made, on an energy per-unit-weight basis, with every reduction of spring material density.

By combining a design which, during a given application, places a significantly greater proportion of spring mass in direct tension by optimizing fiber orientation, with modern technical reinforcing fibers, unexpected gains in elastic energy and other static and dynamic spring functions are possible. A careful selection of the materials utilized in forming the composite yields increases in several areas of spring performance.

Once such improvement is in the area of the specific energy (either per-unit-weight or per-unit-volume) which the spring is capable of storing. Prior art spring materials include homogeneous metal alloys, helical wire springs made with multiple strands wound helically together to provide damping via coulomb friction between the strands, or the previously discussed composite materials. Some of the more important properties for materials under consideration for inclusion in composite spring design are summarized in the following table:

| Material | Tensile Strength | Tensile Modulus | Density | Strain Energy by Volume | Strain Energy by Weight |
|---|---|---|---|---|---|
| Steel | 250,000 psi | $30 \times 10^6$ psi | .283 $lb_m/in^3$ | 1,042 $in\text{-}lb_f/in^3$ | 3,681 $in\text{-}lb_f/lb_m$ |
| Titanium Alloy | 230,000 | $14.8 \times 10^6$ | .176 | 1,787 | 10,154 |
| High-Strength Graphite Fiber | 660,000 | $37 \times 10^6$ | .065 | 5,886 | 90,561 |
| S-2 Glass[a] Fiber | 600,000 | $13 \times 10^6$ | .089 | 13,846 | 155,575 |
| E Glass Fiber | 375,000 | $10 \times 10^6$ | .093 | 7,031 | 75,604 |
| Kevlar 29[b] Aramid Fiber | 525,000 | $12 \times 10^6$ | .052 | 11,484 | 220,853 |
| Dacron[b] Fiber | 162,500 | $2 \times 10^6$ | .050 | 6,602 | 132,031 |

[a]S-2 Glass is a registered trademark of Owens Corning Fiberglas Corp.
[b]Kelvar and Dacron are registered trademarks of E. I. DuPont de Nemours & Co., Inc.

It is obvious from the above table that all of the materials, other than the metals, are superior to the metals in their ability to store elastic potential energy both on a per-unit-volume and on a per-unit-weight basis. Steel, which is the most common spring material, can store only one sixtieth as much energy per unit weight as can some aramid fibers and less than one thirteenth as much per unit volume as the best glass fibers.

At this time, no practical composite can be made with its entire weight and volume made up of nothing but high-strength filaments. Until this becomes possible, in order to bond the fibers into an integral whole, some form of bonding agent or matrix is typically used. Such matrices are typically homomeric or polymeric plastics and take a variety of forms well known in the art, including thermosetting epoxy, polyimide, polyether ether ketone, and polyester resins. The necessity for these matrices decreases the percentage of the fibers in the composite, or volume fiber loading.

Assuming that 50% volume fiber loading can be achieved in a unidirectionally wound composite spring where all the fibers are properly loaded, and that the appropriately compliant polymer bonding matrix has a density of 0.05 $lb_m/in^3$, the relevant properties for the resulting composite spring would be as shown in the following table:

| Reenforcing Material | Tensile Strength | Tensile Modulus | Density | Strain Energy by Volume | Strain Energy by Weight |
|---|---|---|---|---|---|
| High-Strength Graphite Fiber | 330,000 psi | $18.5 \times 10^6$ psi | .0575 $lb_m/in^3$ | 2,943 $in\text{-}lb_f/in^3$ | 51,187 $in\text{-}lb_f/lb_m$ |
| S-2 Glass[a] Fiber | 300,000 | $6.5 \times 10^6$ | .0695 | 6,923 | 99,613 |

| Reenforcing Material | Tensile Strength | Tensile Modulus | Density | Strain Energy by Volume | Strain Energy by Weight |
|---|---|---|---|---|---|
| E Glass Fiber | 187,500 | $5 \times 10^6$ | .0715 | 3,516 | 49,170 |
| Kevlar 29[b] Aramid Fiber | 262,500 | $6 \times 10^6$ | .051 | 5,742 | 112,592 |
| Dacron[b] Fiber | 81,250 | $1 \times 10^6$ | .050 | 3,301 | 66,016 |

[a]S-2 Glass is a registered trademark of Owens Corning Fiberglas Corp.
[b]Kevlar and Dacron are registered trademarks of E. I. DuPont de Nemours & Co., Inc.

Allowing for fifty percent by volume of the composite being matrix, the above tabulated results demonstrate that composite springs utilizing the above-identified fibers are 13 to 30 times lighter than steel, and 2.8 to 6.6 times smaller in terms of volume. Improvements of this magnitude are therefore seen to be achievable if a fiber-reinforced composite, using advanced fibers such as those recited above, can be optimized as an effective spring.

Another advantage attainable in an optimally designed fiber-reinforced composite helical spring is an increase in maximum velocity of motion along the spring's axis, or axial velocity. Many helical spring applications require that one or more points (usually one end) on a spring move at high speed, either episodically or repetitively. Examples include: valve springs in reciprocating engines, which can sometimes be subjected to high end speeds in a periodic fashion; shock and impact attenuation systems, as in automotive suspension or weapons system recoil attenuation and counter-recoil systems, which can impose a high velocity on a spring end in either a periodic or episodic fashion; and finally dart guns, pinball machines and percussion primer firing mechanisms (springs for firing pins) which typically operate episodically compared to the time scale of spring unloading. All of these applications benefit from an increase in axial velocity resulting from the lighter weight and lower elastic modulus (relative to working strength) of composite materials.

It should be noted that any change in the axial velocity of an end of a spring creates an elastic wave which travels along the length of the spring. The change in local axial force that is generated by an imposed change in velocity is as follows:

$$\Delta F = \Delta V \frac{\pi d^3}{8r} \sqrt{\frac{G\rho}{2}}$$

where $\Delta F$ is the change in axial force on the spring, $\Delta V$ is the imposed change in velocity of the end of the spring, d is the "wire" diameter, r is the radius of the spring helix, G is the effective elastic shear modulus of the material and $\rho$ is the average mass density of the spring material.

For materials of similar effective working shear strength, a spring can be constructed for a given maximum static load and spring rate from each of said materials with the same wire diameter and helix radius: the differences in elastic modulus can be compensated for by making the springs with more or less coils to correspond with greater or lesser elastic moduli, respectively. Since we can compare springs of similar local geometry, it is apparent from the above equation that selecting spring materials having lesser elastic modulus and/or lower mass density will result in a spring have a smaller wave (dynamic) force for a given imposed velocity change. This results in less stress on the spring itself during use, and reduces any shock transmitted through the spring as a wave force.

It is also the case that springs made from lighter and less stiff materials experience less stress for a given imposed velocity change, as is apparent from the following equation:

$$\tau_{max} = \Delta V \sqrt{2G\rho}$$

where $\tau_{max}$ is the approximate maximum shear stress in the "wire," and the other variables are as above. From this it is apparent that the maximum speed to which a given material spring can launch an object is $$V_{max} = \frac{\tau_{working}}{\sqrt{2G\rho}}$$

which implies that a Kevlar-reinforced composite spring should be able to launch a light object at a speed between three and four times that achievable with the best steel spring.

By utilizing an optimally designed composite spring having a low shear modulus and density, an additional advantage obtains. In springs that are subjected to periodic motion, it is well known that stresses can become excessive and motion unpredictable if the dynamic waves generated in the spring resonate at or near the frequency of the imposed periodic motion (as in valve springs in high speed internal combustion engines). Since such applications typically run at a range of frequencies, it is common practice to design the system (including the springs) so that the highest frequency of imposed motion is below the lowest surging frequency of the springs used. This can impose a maximum velocity on the system which is thus limited by spring performance. Because the equation for the lowest surge frequency of a helical spring is $$f_1 = \frac{2\sqrt{2} \; kr}{\pi d^3 \sqrt{G\rho}}$$

where k is the spring force gradient or spring rate (which is usually prescribed to meet the demands of a particular application), it becomes apparent that by selecting materials having lower shear modulus and density, i.e. high performance, optimally wound composites, the resultant springs formed therefrom exhibit an increased surge frequency. Such springs would therefore be useable at higher speeds and over a broader range of applications.

The potential exists then to significantly improve the performance, in several important areas, of prior art helical and torsion metallic and composite springs. These improvements include decreases in physical size, density, and shock transmitted through the spring as a wave force, and increases in elastic potential energy (both on a per-unit-volume and on a per-unit-weight basis), surge frequency, and axial velocity.

The foregoing discussion demonstrates that, in addition to enabling the use of smaller and lighter weight springs in static applications, these springs should also be superior in all dynamic respects. In suspension and recoil attenuation systems, less surge force will be transmitted from the moving end to the fixed end of a spring when it is dynamically loaded. In mass launching systems, masses can be launched to higher speeds. In periodically loaded applications, springs can be safely used at higher frequencies, allowing higher operating speeds for the use application. Finally, in all dynamic applications, the induced dynamic stress can be less for a given imposed end velocity change, which should yield greater spring life or greater design flexibility in all dynamic applications.

SUMMARY OF INVENTION

The present invention recognizes that springs are often loaded either wholly or predominantly in one direction: tension, compression, or unidirectional torsion. Since the prior art composite springs teach braiding or cross-weaving of the reinforcing fibers thereof, in any given application, only one half of those fibers contribute fully to the working strength of the spring. Approximately one half of the reinforcing fibers in these designs are therefore only partially loaded in any given application. By winding the reinforcing fibers in only one direction, effectively all the fibers can be used to store energy. The volume fiber loading can also be maximized. As used herein, this winding of fibers in only one direction is referred to as unidirectional winding. By unidirectionally orienting the reinforcing fibers, the energy per-unit-volume, or per-unit-weight, for a given composite can be greatly increased.

It also follows that by forming a fiber-reinforced composite spring from unidirectionally-wound fibers wound at an optimal wind angle around a lightweight core and where the fibers are of materials which are both lighter and have lower elastic moduli than currently used spring materials of equal or inferior strength, significant advantages in physical size, density, and shock transmitted through the spring as a wave force, elastic potential energy (both on a per-unit-volume and on a per-unit-weight basis), surge frequency, and axial velocity accrue.

The spring taught by the present invention has a cylindrical or helical core that is wrapped in, and intimately bonded to, a fiber-reinforced composite cladding which is more or less evenly and concentrically distributed around the section of the core. A resin matrix, such as a thermosetting epoxy, polyimide, polyether ether ketone, or polyester resin unifies the composite. The more evenly the cladding is wound, the greater the fiber loading. If performed as perfectly wound fibers, or fiber bundles, with each successive course resting in the trough created by two preceding courses of windings, the maximum volume fiber loading, that of hexagonal closest packing is attained.

In order to prevent deformation or failure of the reinforcing fibers in the cladding, the core is large with respect to those fibers. The ratio of the diameter of the core to the diameter of the fibers is application dependent, but is typically greater than about 50:1.

The core is loaded in hydrostatic or triaxial compression by the fibers, which are entirely or predominantly loaded in tension. The great majority of the fibers in the composite cladding follow approximately helical paths with the same sense of twist around the center of the core. That predominant twist direction is chosen so that the majority of fibers are placed in tension under the loading for which the particular spring is designed. As taught by the present invention, a helical compression spring has its fibers wound around the core in the sense opposite to that of the overall helix, and a helical tension spring has its fibers wound in the same sense as the spring helix. A cylindrical torsion bar has a right-handed fiber wind, i.e., clockwise rotation with greater distance from the observer, if the near end is subjected to a counter-clockwise torque while the far end sees a clockwise torque, and vice-versa.

The core is subjected to torsional, or shear strain and radial and axial compressive stress. The hoop stress in the wall of a thin-walled cylindrical pressure vessel is twice the axial stress. The component of fiber tension times the component of numerical fiber section density should be proportional to the stress in the respective directions. In order to optimize the previously discussed unidirectional fiber wind, an optimal winding angle is required. Since it follows that if the angle between the fibers and the core axis is approximately equal to the arctangent of $\sqrt{2}$ ($\tan^{-1}(\sqrt{2})=54.736°$), an optimal winding angle of approximately 55° is obtained. By utilizing that winding angle, the axial and radial compressive stresses in the core are equalized and the core is subjected to torsional shearing superposed on hydrostatic compression. This allows the core to be made of materials with very unimpressive mechanical properties: moderate working shear strain and reasonably stiff elastic response to bulk compression. A wide variety of materials compatible with the composite matrix are thence seen to be suitable for inclusion as core materials for springs as taught by the present invention.

The above defined 55° fiber-to-helix angle is the optimum for exploitation of composite materials in this type of spring. In order to improve, in a given application, selected aspects of static or dynamic spring performance, that winding angle may, of necessity be modified.

Smaller angles make the axial compression of the core greater than the radial compression, resulting in axial shortening and radial growth. This in turn creates a hoop tension in the composite cladding and can potentially split the cladding along the fibers. To alleviate this problem, the core can be reinforced with fibers which stiffly resist compression, such as graphite. This fiber reinforcement of the core may be such that the fibers are axial with respect to the length of the core or nearly so, or the fibers thereof may be twisted about the longitudinal axis of the core material. Likewise, a larger angle causes the radial compression to be greater than the axial and promotes radial shortening and axial extension. This again has the potential for splitting the composite matrix between the fibers. Again, for a helix angle greater than 55°, there is a simple solution: fiber reinforcement of the core. A core which is thus fiber-reinforced will resist the axial extension so that no splitting can occur.

Fiber reinforcement of the core may be axial, substantially axial, or may be subjected to slight twist. In a fiber-reinforced core with axial or substantially axial reinforcement, the core fibers on the outside curve of the helix follow a longer arc that those on the inside of the curve. This fact points out the possibility of fibers inside the curve having a tendency to bend and kink when the uncured spring is formed into a helix. One solution to this potential problem is to impart a slight twist to the core fibers as the core is formed so that outside core fibers twist around from the outside to the inside in sufficiently short distance as to ensure that each of the single fiber arcs has approximately the same length. Thus, the twist is not primarily intended to affect the elastic properties of the spring, but to equalize the path length and hence minimize buckling of the reinforcing fibers. The direction of the twist should preferably be in the same sense or direction as the fibers of the cladding. While the degree of twist will vary with several factors, it should generally be in the range of ½ to 1 complete turn per coil of the ultimately formed helix. Further, it may be beneficial to apply the twist to the core after winding the cladding thereabout in order to assist in squeezing excess resin from the spring wire before forming into its ultimate helical form.

The present invention is thus a cylindrical torsion bar, or a helical tension or compression spring having a core that is either unreinforced or axial-fiber reinforced, and a continuous-fiber-reinforced composite cladding having most or all of its fibers helically arrayed unidirectionally around the core. The core may be solid or hollow. Where a hollow core is indicated, that core must be chosen from a material having compressive strength. The sense of the helical winding is that which places the fibers in tension when the spring is used as intended. A fiber winding helix angle of approximately 55° is used with a weak and unreinforced core, while larger or smaller helix angles are used only with a cores having sufficient stiffness to resist axial-normal stress.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing.

Figure 3:
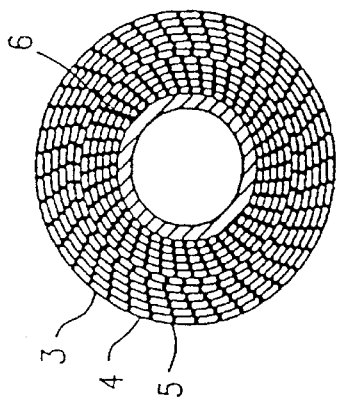
FIG. 3 is a cross section of fiber-reinforced composite spring according to the present invention implemented on a tubular core.

Reference numbers refer to the same or equivalent parts of the present invention throughout the several figures of the drawing.

BEST MODE FOR CARRYING OUT THE PRESENT INVENTION

Figure 1:
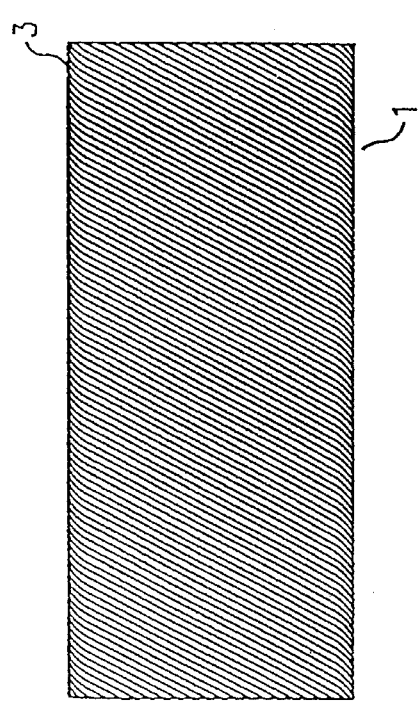
FIG. 1 is a segment of a fiber-reinforced composite torsion bar according to the present invention showing the winding angle of the reinforcing fibers.

Referring to FIG. 1, a straight cylindrical torsion bar 1 constructed according to the principles of the present invention is shown. Torsion bar 1 includes a cylindrical core 2 made of unreinforced polyester and a cladding 3 made of 50% by volume aramid fibers 4 and 50% polyester resin 5, the fibers being wound around the core at an angle 55° from parallel to the core axis and the resin serving to bind the fibers to each other and to the core. The ratio of the core diameter to the fiber diameter is 100:1. Each end of the torsion bar may be fitted with suitable torque transmitting means (not shown).

Figure 2:
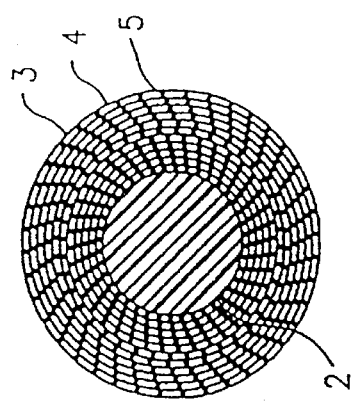
FIG. 2 is a cross section of fiber-reinforced composite spring according to the present invention implemented on a solid core.

FIG. 2 is a cross-sectional view of one embodiment of the present invention having cladding 3 composed of fibers 4 and resin 5 wound around a solid core 2. Solid core 2 may be composed of metals including, but not necessarily limited to steel, aluminum, titanium, magnesium and their several alloys as well as proprietary memory alloys such as Raychem's Tinel®. Solid core 2 may further be composed of rubber and plastics including, but not necessarily limited to epoxies and polyesters. Such plastic cores may be unreinforced or reinforced with fibers. Reinforcing fibers suitable for inclusion in core 2 include but are not necessarily limited to fiber glass, aramids, and graphite.

FIG. 3 is a cross-sectional view of another embodiment of the present invention having cladding 3 composed of fibers 4 and resin 5 wound around a tubular core 6. Tubular core 6 may be composed of metals including, but not necessarily limited to steel, aluminum, titanium, magnesium and their several alloys, as well as proprietary memory alloys such as Raychem's Tinel®. Tubular core 6 may further be composed of rubber and plastics including, but not necessarily limited to epoxies and polyesters. Such plastic cores may be unreinforced or reinforced with fibers. Reinforcing fibers suitable for inclusion in core 6 include but are not necessarily limited to fiber glass, aramids, and graphite.

Figure 4:
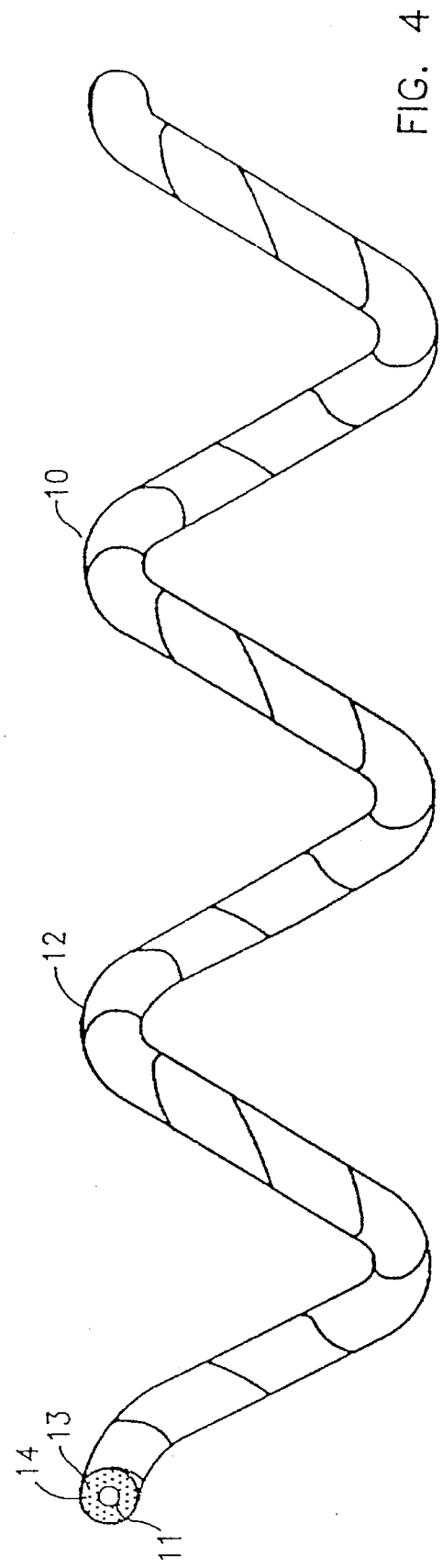
FIG. 4 is a segment of a fiber-reinforced composite helical spring according to the present invention, designed for compression loading.

Referring to FIG. 4, a helical compression spring 10 formed according to the principles of the present invention is shown. Spring 10 includes a helical core 11 having a circular section and a cladding 12. Core 11 is formed of unreinforced polyester. Cladding 12 is formed of a composite including 50% by volume aramid fibers 13 and 50% epoxy resin 14, fibers 13 being wound around core 11 at an average angle 55° from parallel to the core axis and in the opposite sense from the overall helix. The ratio of the core diameter to the fiber diameter is 50:1.

Figure 5:
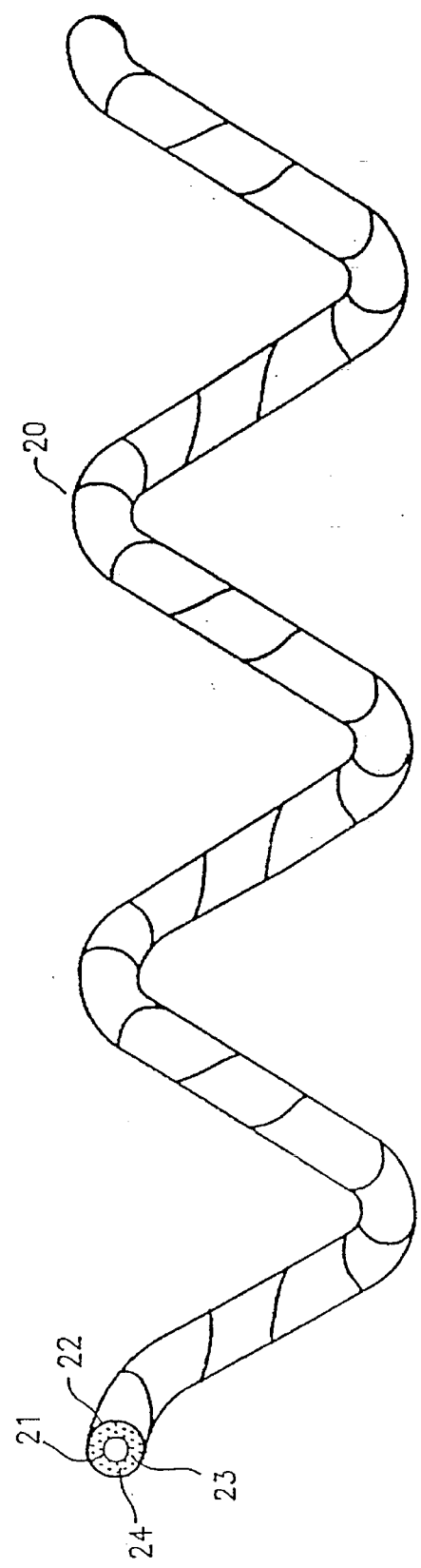
FIG. 5 is a segment of a fiber-reinforced composite helical spring according to the present invention, designed for tension loading.

With reference to FIG. 5, a helical tension spring 20 formed according to the principles of the present invention is shown. Spring 20 includes a helical core 21 having a circular section and formed of unreinforced nylon. Cladding 22 is formed of 52% by volume aramid fibers 23 and 48% epoxy resin 24, fibers 23 being wound around core 21 at an average angle 55° from parallel to the core axis and in the same sense as the overall helix. The ratio of the core diameter to the fiber diameter is 85:1.

Figure 6:
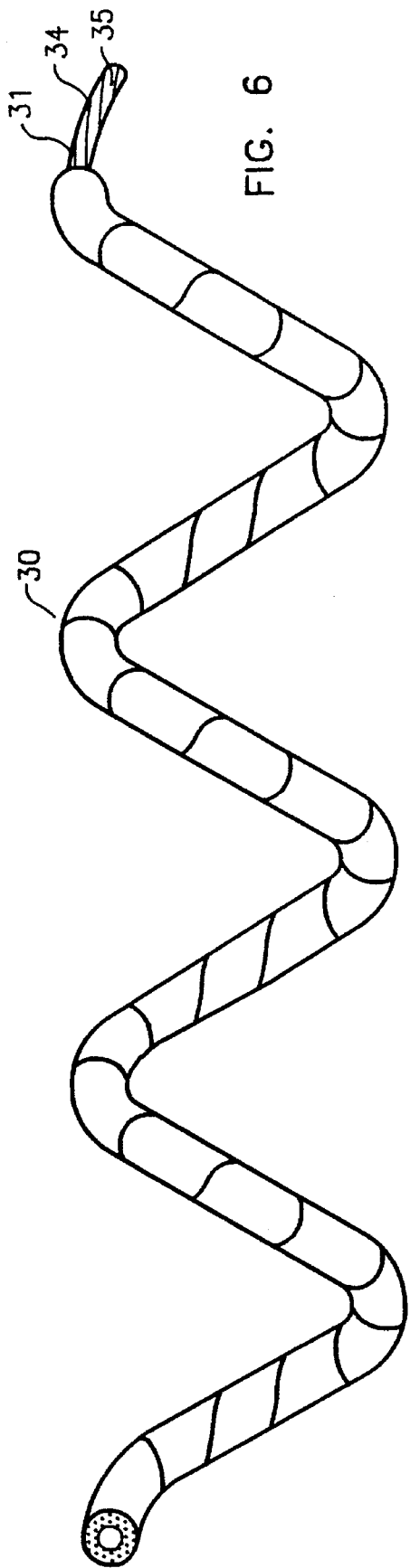
FIG. 6 is a segment of a fiber-reinforced composite helical spring implemented according to the present invention on a twisted, fiber-reinforced core.

Having reference to FIG. 6, a helical compression spring 30 having a twisted fiber-reinforced core is shown. Spring 30 includes a helical core 31 having a circular section and formed of fiber-reinforced plastic composed of 50% by volume aramid fibers 34 and 50% epoxy resin 35. The several fibers 34 of core 31 are twisted in the same sense as the spring helix, at a twist substantially equal to 1 twist per coil of the ultimately formed helix. Note that the degree of core twist has been exaggerated for clarity in FIG. 6: the actual degree of core twist is substantially in the range of 0.5 to 1.5 twists per resultant spring helix coil. The core twist is not primarily intended to affect the elastic properties of the spring, but to equalize the path length and hence minimize buckling of the reinforcing fibers. The ratio of the core diameter to the fiber diameter is 50:1.

Variations on core materials and winding angles include, but are not limited to substituting one of the above-specified cores with the following examples, and implementing the specified winding angle:

1) A graphite fiber axially-reinforced epoxy core, for bending stiffness, while keeping the cladding unchanged.

2) A shape-memory alloy core, such as Raychem's Tinel®, for damping, while keeping the cladding unchanged.

3) A solid or tubular magnesium alloy or titanium alloy core while keeping the cladding unchanged.

4) A graphite fiber reinforced core combined with a cladding winding angle of about 45 degrees.

5) An axial aramid fiber reinforced polyester core combined with a cladding winding angle of about 75 degrees.

6) A graphite-fiber reinforced core and an average cladding winding angle of approximately 50 degrees.

7) An axial aramid-fiber reinforced polyester core and an average cladding winding angle of about 80 degrees.

8) A glass fiber reinforced epoxy core and an average cladding winding angle of about 50 degrees.

9) An axial aramid fiber reinforced rubber core and an average cladding winding angle of about 80 degrees.

10) A bundled multi-strand piano wire core.

Further, the aramid fibers in any of the above variations can be replaced with glass or graphite fibers, although such substitution does decrease, to some extent, the energy storage capability of the resultant spring.

The fiber-reinforced composite spring taught by the present invention may be implemented by winding the fiber cladding about the core at the selected winding angle, saturating the resultant "wire" with matrix material, and forming the spring by means of winding the wire about an external mandrel, internal mandrel, or multi-part internal-external mandrel. The fiber-reinforced composite spring taught by the present invention may further be implemented by manually winding the fiber cladding about the core at the selected winding angle and saturating the resultant spring with matrix material. Fibers wound in the cladding may be provided as individual filaments, bundled as yarn or roving, or as tapes. Any of these alternatives may be previously impregnated with one or more components of the matrix. Alternatively, the spring may be formed by inserting the wire, without matrix, into a mold or form, and injecting the matrix about the wire. After the matrix hardens, the resultant spring is removed from the mandrel or mold.

Finally, the core twist and cladding winding angles taught herein are for illustrative purposes only. Core twists and cladding or fiber winding angles substantially different from those discussed herein may be required by the application for which the spring is designed, and such alternative twists and winding angles are specifically contemplated by the principles of the present invention.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. In particular, substitutions in materials, specialized end fittings, variations in material combinations, core twists and cladding wind angles as may be required for springs designed for a particular application are specifically contemplated by the principles of the present invention. Furthermore, it is anticipated that advances in technical reinforcing fibers and matrices will eventuate. The present invention specifically contemplates that the utilization of those improved fibers and matrices, as they become available, will further improve the spring performance advances cited herein. It will be appreciated then that the invention illustratively disclosed herein may be practiced with elements which are not specifically disclosed herein. Alternative reinforcing fibers, matrix resins, polymers or monomers, or different core twists and fiber winding angles not identically disclosed herein, are specifically contemplated in forming the fiber-reinforced composite springs taught by the present invention.

I claim:

1. A fiber-reinforced composite spring comprising:

a fiber-reinforced core having moderate working shear strain and stiff elastic response to bulk compression, wherein the core-reinforcing fibers are twisted about the longitudinal axis of said core;

a fiber-reinforced composite cladding, the cladding fibers being substantially helically and unidirectionally wound concentrically about the section of said core at a prescribed winding angle, said cladding compressing said core when said spring is subjected to one of any and all of compression, tension or torsion; and a resin matrix for intimately bonding said cladding together and to said core.

2. The fiber-reinforced composite spring of claim 1 wherein said spring further comprises:

said winding angle in the range of 48 to 80 degrees from parallel with respect to the axis of said core; and said resin matrix selected from the group consisting of thermosetting epoxy resin and thermosetting polyester resin.

3. The fiber-reinforced composite spring of claim 2 wherein said spring is a helical compression spring further comprising:

said core defining the primary helix of said spring; and said cladding fibers wound in the opposite winding sense from said primary helix.

4. The fiber-reinforced composite spring of claim 2 wherein said spring is a helical tension spring further comprising:

said core, defining the primary helix of said spring; and said cladding fibers wound in the same winding sense as said primary helix.

5. The fiber-reinforced composite spring of claim 2 wherein said spring is a unidirectional torsion spring further comprising:

said core defining a cylinder; and said cladding fibers wound with a winding sense which places said fibers under tension in one sense of rotation.

6. The fiber-reinforced composite spring of claim 1 wherein said fiber-reinforced cores are formed from resins selected from the group consisting of: epoxy and polyester, and reinforced with fibers selected from the group consisting of: glass; graphite; aramid; and steel.

7. The fiber-reinforced composite spring of claim 1 wherein said core is tubular.

8. The fiber-reinforced composite spring of claim 2 wherein said winding angle is further defined as being in the range of 48 to 64 degrees from parallel with respect to the axis of said core.

9. The fiber-reinforced composite spring of claim 2 wherein said winding angle is further defined as being in the range of 53 to 57 degrees from parallel with respect to the axis of said core.

10. The fiber-reinforced composite spring of claim 2 wherein said winding angle is further defined as being substantially 55 degrees from parallel with respect to the axis of said core.

11. A fiber-reinforced helical composite compression spring comprising:

an aramid fiber-reinforced epoxy resin core defining the primary helix of said spring, wherein the core-reinforcing fibers are twisted about the longitudinal axis of said core;

an aramid fiber-reinforced composite cladding formed of aramid reinforcing fibers, said cladding fibers having a diameter not larger than 0.02 times the diameter of said core and being substantially helically and unidirectionally wound in the opposite winding sense from said primary helix and concentrically about the section of said core at a prescribed winding angle of 55 degrees from parallel with respect to the axis of said core, said cladding compressing said core when said spring is subjected to one of any and all of compression, tension or torsion; and a thermosetting epoxy resin matrix for intimately bonding said cladding fibers together and to said core.

12. A fiber-reinforced helical composite tension spring comprising:

an aramid fiber-reinforced epoxy resin core defining the primary helix of said spring, wherein the core-reinforcing fibers are twisted about the longitudinal axis of said core;

an aramid fiber-reinforced composite cladding formed of aramid reinforcing fibers, said cladding fibers having a diameter not larger than 0.02 times the diameter of said core and being substantially helically and unidirectionally wound in the same winding sense as said primary helix and concentrically about the section of said core at a prescribed winding angle of 55 degrees from parallel with respect to the axis of said core, said cladding compressing said core when said spring is subjected to one of any and all of compression, tension or torsion; and an epoxy resin matrix for intimately bonding said cladding fibers together and to said core.

* * * * *